Sept. 19, 1961  C. B. MARSHALL ET AL  3,000,391
AUTOMATIC CONTROLLER FOR BELT CONVEYOR SPRAYER SYSTEMS
Filed Dec. 31, 1958  2 Sheets-Sheet 1

Inventors
Charles Bernard Marshall
and Cyril Marshall
By
Watson, Cole, Grindle & Watson
Attorney 3,000,391
AUTOMATIC CONTROLLER FOR BELT CONVEYOR SPRAYER SYSTEMS
Charles Bernard Marshall, 21 Ribblesdale Road, Sherwood, Nottingham, England, and Cyril Marshall, "Trees," Winchester Ave., Beeston, England
Filed Dec. 31, 1958, Ser. No. 784,256
4 Claims. (Cl. 137—343)

This invention relates to automatic controllers for belt conveyor spray systems, for damping the material on the conveyor, as is particularly desirable to settle dust on a conveyor in mines and quarries where forced draught is used for ventilating purposes and would otherwise pick up the dust and carry it along with it.

However, such conveyors operate intermittently and in addition may be irregularly loaded. Manual control of a spray to avoid excess application of liquid to a loaded conveyor that has been stopped, or to avoid application of liquid to parts of a moving conveyor that are not loaded is both expensive in labor and uncertain in result. Control of the spray by the driving mechanism of the conveyor cannot take account of absence of load on the conveyor, and, while it has been proposed to provide a spray valve with a lever that is operated by depression of the conveyor belt under load, this can take no account of stoppage of a loaded conveyor.

The object of the invention is to provide an automatic controller that takes account of both belt stoppage and absence of load on a belt, and according to the present invention an automatic controller for a belt conveyor spray system comprises a valve, a valve-operating device, a pulley adapted to be engaged by a conveyor belt that is depressed by a load on the belt and only to be driven when a belt that is so depressed is also in conveying movement, and an operative connection to the valve-operating device driven by rotation of the pulley.

In one embodiment of the invention, the pulley is operatively connected to a pump, and the valve-operating device is itself operated by fluid delivered by the pump when the pulley is rotated. The pump and the valve-operating device are conveniently formed as a unit that also carries the pulley, the whole unit being resiliently supported. Thus, the unit may be carried by a lever pivoted on a base plate, with a compression spring between the base plate and the lever to urge the latter, together with the unit, upwardly to a position in which the pulley is just clear of the operative run of a conveyor belt under which the whole controller is positioned. The precise position of the pulley may be adjusted by adjusting the position of the lever, as by means of a rotatable cam to engage an arm of the lever projecting beyond the pivot.

An example of a controller containing the features of the embodiment just indicated will now be described with reference to the accompanying drawings, in which—

Figure 1:
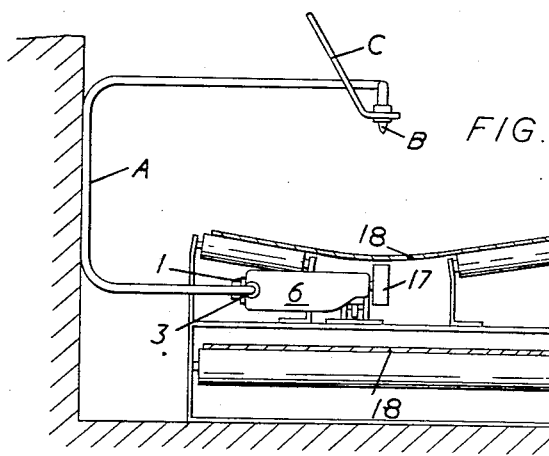
FIGURE 1 is an elevation showing the controller installed below a conveyor belt, the latter shown in section.
Figure 2:
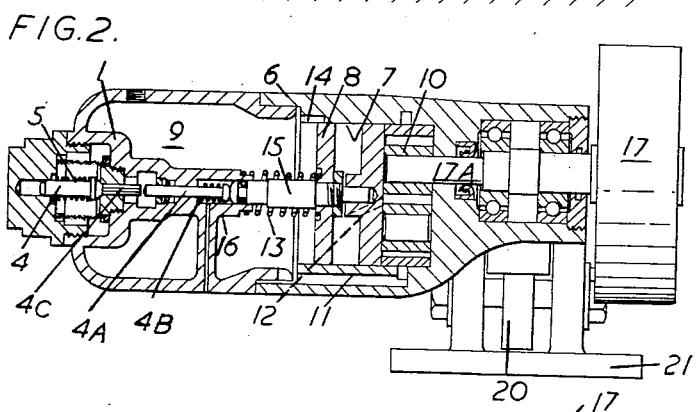
FIGURE 2 is an elevation, to a larger scale and mainly in section of the controller itself.
Figure 3:
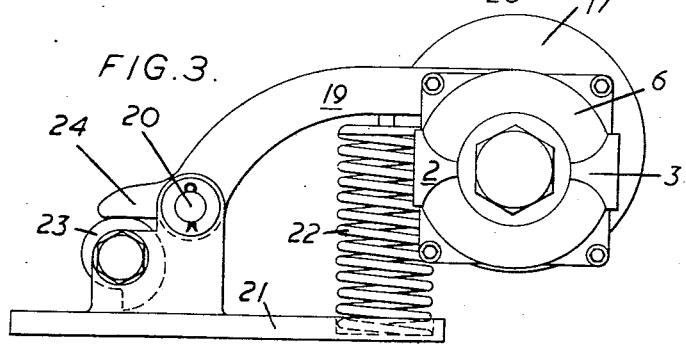
FIGURE 3 is an end elevation of FIGURE 2, as seen from the left.
Figure 4:
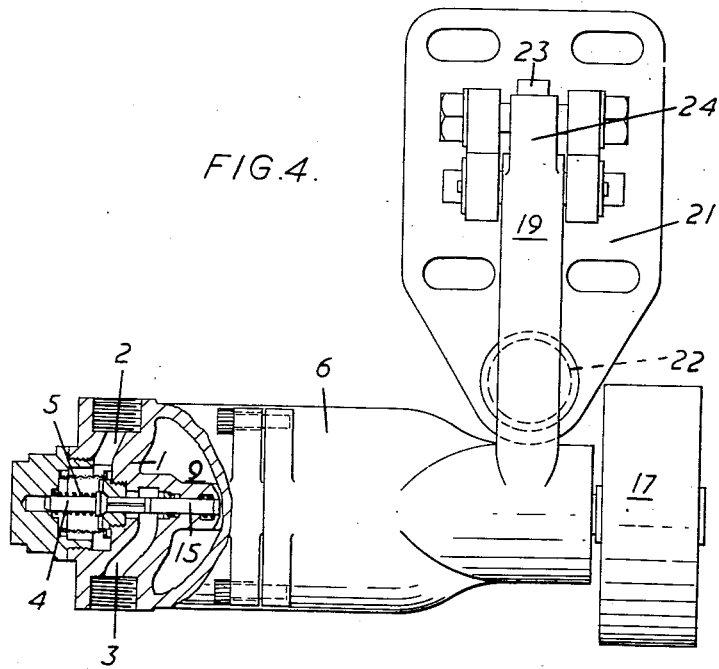
FIGURE 4 is a plan, partly in section, of the controller.

As shown in FIGURES 2 and 4, a valve 1 with an inlet 2 for spray liquid and an outlet 3 for the liquid, leading by a flexible pipe A (FIGURE 1) to one or more spray nozzles B each suspended by a hanger C, has its valve stem 4 urged to closed position by a spring 5. The valve 1 is in one end of a casing 6 containing a cylinder 7 co-axial with the valve stem 4. Between a piston 8 in the cylinder and the valve 1, the casing 6 forms an oil reservoir 9. Adjacent to the cylinder 7, the casing contains an oil pump 10, conveniently of the gear type, which serves to draw oil from the reservoir 9 on one side of the piston 8 through a duct 11 and feed it into the cylinder 7 through a duct 12, thus tending to move the piston 8 in the direction of the valve 1 against the opposition of a spring 13. After being forced by the oil over a short predetermined distance, the piston 8 opens a by-pass 14 in the cylinder wall, to put the cylinder 7 into communication with the reservoir 9, so that any further oil fed by the pump returns to the reservoir and the piston 8 remains stationary.

The piston 8 carries a piston rod 15, surrounded by the spring 13, which rod passes through a gland 16 to engage an unseating pin 4A for the valve stem 4, which pin is returned by a spring 4B to a position just clear of the part 4C of the valve 4.

The pump 10 is driven by a pulley 17, which overhangs the end of the casing 6 remote from the valve 1, the pump and pulley spindle 17A being horizontal, so that the upper side of the pulley may be disposed clear of the underside of an unloaded belt 18 (FIGURE 1). The pulley 17 is brought to this position by the casing 6 by which it is carried being carried by a lever 19 pivoted at 20 on a base plate 21 and itself supported by a compression spring 22. The uppermost position of the line 19 and the whole unit of valve 1 and its operating mechanism contained in the casing 6, is adjusted by a rotary cam 23 on the base plate 21, which cam serves as a stop to engage an arm 24 of the lever 19 projecting beyond the pivot 20, and to adjust the position to which the lever 19 and the casing 6 are brought in relation to the base plate 21 by the expansion of the compression spring 22.

With the pulley 17 clear of the belt 18, as is the case when the belt is not loaded, the spring 13 urges the piston 8 in the direction away from the valve 1, clearance round the piston allowing oil to flow from the cylinder 7 to the reservoir 9. However, when the belt 18 is both in motion and carries a load, it is depressed by the load, so that its moving underside not only engages the pulley 17 but drives it. The pump 10 is thus driven, the piston 8 causes the pin 4A to unseat the valve member 4 and the spray liquid (usually water) supplied to the inlet 2 passes by the outlet 3 through the pipe A to the nozzle B. Spraying thus starts substantially instantaneously with motion of the loaded belt. If the belt 18 is heavily loaded, the spring 22 is compressed, to avoid excessive pressure on the pump-driving mechanism.

If the loaded belt stops, the pulley 17 is not driven, the mere contact with the pulley produced by the depression of the belt being ineffective to open the valve 1. Again, if the belt still in motion carries no load over any part of its length, the belt is not depressed to make the necessary driving contact with the pulley 17, so that again the valve 1 is not opened. Only when there are the simultaneous factors (a) belt in motion and (b) load on belt is the valve opened, so that only material actually in motion along the belt run receives the spray. However, if absence of either one of these factors brings about a cessation of spraying, spraying is automatically resumed when both factors are again present. Consequently, without any need for constant observation, and without the danger that an operative could fail to operate a valve correctly, all material that is moved along by the belt automatically becomes sprayed; overspraying of material on a stationary belt is avoided; and spraying of an unloaded belt is likewise avoided.

What we claim is:

1. An automatic controller for a belt conveyor spray system, comprising a pump, a pulley in operative connection with the pump, a cylinder, a piston movable along the cylinder, an oil reservoir separated from the cylinder by the piston, a feed duct from the reservoir to the pump, a delivery duct from the pump to the cylinder, a valve for admitting spraying liquid to a spray nozzle, the valve being opened by movement of the piston toward the reservoir, and a spring disposed to oppose such movement of the piston but overcome by the pressure of the oil when the pulley is driven, the pump, pulley, cylinder, and valve being combined as a unit with the pulley exposed at one end of the unit in a position to be driven by a moving conveyor belt that is depressed by a load into engagement with the pulley.

2. A controller as in claim 1, wherein the cylinder has a by-pass that is operable after predetermined valve-opening movement of the piston by the pump to put the cylinder into communication with the reservoir to limit the piston movement.

3. An automatic controller for a belt conveyor spray system, comprising a casing, a valve at one end of the casing for admitting spraying liquid to a spray nozzle, a pump towards the other end of the casing, an oil reservoir to supply the pump, a pulley, a horizontal shaft connecting the pump and the pulley, with the pulley lying beyond the other end of the casing to be engaged and rotated only by a conveyor belt that is both moving and depressed by a load, a piston in the casing between the pump and the valve and movable toward the valve in response to operation of the pump on rotation of the pulley, a spring urging the piston away from the valve, and a piston rod serving to unseat the valve when the piston and the piston rod are moved by pressure of oil from the pump toward the valve in opposition to the spring.

4. A controller as in claim 3, comprising a lever projecting laterally from the casing, a base plate, a horizontal pivot connecting the lever to the base plate, a compression spring disposed between the lever and the base plate, an arm on the lever projecting beyond the pivot, and a cam adjustably carried on the base plate in position to engage the arm for adjustment of the position to which the lever and the casing are brought in relation to the base plate by the expansion of the compression spring.

References Cited in the file of this patent

UNITED STATES PATENTS

| | | |
|---|---|---|
| 431,596 | Lathrop | July 8, 1890 |
| 1,256,425 | Ayres | Feb. 2, 1918 |
| 1,708,903 | Schroder | Apr. 9, 1929 |
| 1,935,877 | Hamerstadt | Nov. 21, 1933 |
| 2,201,774 | Hofele | May 21, 1940 |
| 2,207,697 | Kendall | July 16, 1940 |
| 2,273,126 | McGillin | Feb. 17, 1942 |
| 2,391,930 | Stone | Jan. 1, 1946 |
| 2,417,353 | Crane | Mar. 11, 1947 |
| 2,557,884 | Mueller | June 19, 1951 |
| 2,721,566 | Brucker | Oct. 25, 1955 |